United States Patent [19]

Lee

[11] 4,400,718
[45] Aug. 23, 1983

[54] DIGITAL TELEVISION TRANSMISSION USING CHROMINANCE INVERSION

[75] Inventor: Pok F. Lee, Richmond, Canada

[73] Assignee: Northern Telecom Limited, Montreal, Canada

[21] Appl. No.: 270,591

[22] Filed: Jun. 4, 1981

[51] Int. Cl.³ .............................................. H04N 9/32
[52] U.S. Cl. ...................................................... 358/13
[58] Field of Search ........................ 358/13, 11, 40, 31

[56] References Cited

U.S. PATENT DOCUMENTS

| | | | |
|---|---|---|---|
| 3,858,240 | 12/1974 | Golding et al. | 358/13 |
| 4,093,949 | 6/1978 | Hedlund | 358/4 |
| 4,124,205 | 2/1979 | Iinuma | 358/13 |
| 4,227,204 | 10/1980 | Rossi | 358/13 |

OTHER PUBLICATIONS

"Interframe Coding for 4MHz Colour Television Signals" by K. Iinuma et al., IEEE Transactions on Communications, vol. COM-23, No. 12, Dec. 1975, pp. 1461 to 1465.
"Composite Interframe Coding of NTSC Colour Television Signals" by T. Ishiguro et al., NTC 1976 (Dallas), vol. 2, pp. 6.4–1 to 6.4–5.

Primary Examiner—Tommy P. Chin
Attorney, Agent, or Firm—R. John Haley

[57] ABSTRACT

At a transmitter, an analog NTSC color video signal is converted into a digital video signal and all of the signal components in the chrominance spectral band in alternate television frames are inverted. The resultant signal is transmitted via a low-speed digital signal transmission channel using interframe difference coding. At a receiver, the received digital signal is converted into an analog video signal and all of the signal components in the chrominance spectral band in the other alternate television frames are inverted. The resultant signal, having inverted chrominance, is reproduced on a conventional NTSC color television receiver. Bandpass and comb filtering, preferably on the digital signals, are used at the transmitter and at the receiver to separate the luminance and chrominance signal components to enable inversion of the chrominance components.

6 Claims, 6 Drawing Figures

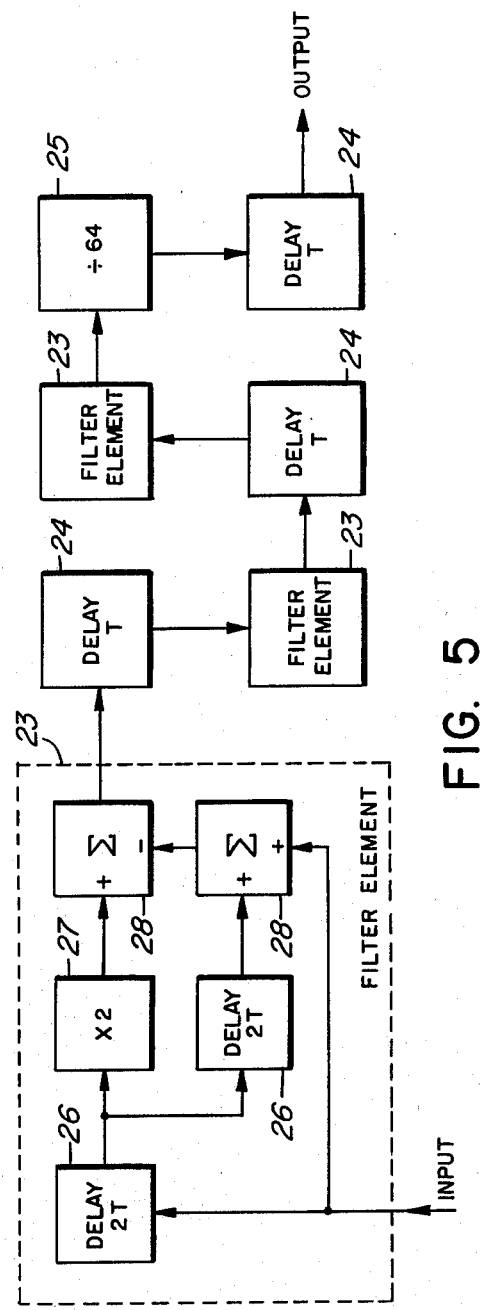
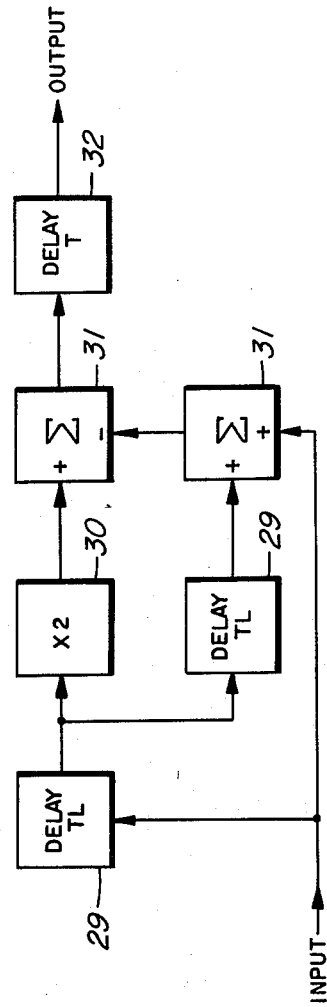
FIG. 5
FIG. 6

DIGITAL TELEVISION TRANSMISSION USING CHROMINANCE INVERSION

This invention relates to a method of transmitting an NTSC colour video signal via a digital signal transmission channel.

It is known to use interframe difference coding to reduce the bit rate required for transmission of a video signal via a digital transmission channel. In such a scheme used for a monochrome video signal, the video signal is digitized into picture elements (pels), and the transmitted signal for each pel is based upon the difference between the current gel magnitude and a magnitude predicted from the pel magnitude in the previous frame.

In an NTSC colour video signal, each pel comprises a luminance component and chrominance components which are quadrature-modulated on a colour subcarrier at a frequency (about 3.58 MHz) which is an odd multiple of half the television line frequency, and hence also an odd multiple of half the television frame frequency. In consequence, the chrominance component of the NTSC colour video signal is inverted each line and, for any given line, each frame, making a conventional monochrome signal pel predictor inadequate.

In order to avoid the problem of colour subcarrier phase inversion, the NTSC colour video signal can be demodulated into baseband luminance and chrominance signals (see for example "Interframe Coding for 4 MHz Colour Television Signals" by K. Iinuma et al, IEEE Transactions on Communications, Vol. COM-23, No. 12, Dec. 1975, pages 1461 to 1465). This technique involves the use of extensive hardware and is consequently expensive.

It is also known to use orthogonal transformation, as disclosed in "Composite Interframe Coding of NTSC Colour Television Signals" by T. Ishiguro et al, NTC 1976 (Dallas), Vol. 2, pages 6.4-1 to 6.4-5, to separate the NTSC colour video signal into predominantly luminance and chrominance components in successive lines. In this case pairs of consecutive television scan lines are converted into a line sum and a line difference, containing mainly the luminance and the chrominance components respectively, the line sum and difference being encoded and transmitted successively. In this technique the waveform of the NTSC colour video signal is strictly preserved. However, the orthogonal transformation technique does not completely separate the luminance and chrominance components, with a consequent reduction in interframe coding efficiency, and does not permit sub-Nyquist sampling. As a result, this technique is only useful in high bit rate transmission systems, for example from 16 to 32 Mb/s.

Accordingly, an object of this invention is to provide an improved method of transmitting an NTSC colour video signal via a digital signal transmission channel. In particular, the invention seeks to provide a method which facilitates a reduction of the hardware required for transmitting a colour video signal of suitable quality for teleconference or video telephone purposes via a relatively low bit rate (e.g. 6 M/s) digital signal transmission channel.

According to one aspect of this invention there is provided a method of transmitting an NTSC colour video signal via a digital signal transmission channel, comprising the steps of:- inverting components of said video signal in the chrominance spectral band in alternate television frames to provide an alternate-frame chrominance-inverted video signal; transmitting said alternate-frame chrominance-inverted video signal via said digital signal transmission channel in the form of a digital signal encoded using interframe difference coding at the transmitter and decoding it at the receiver; and inverting components of the decoded video signal in the chrominance spectral band in the other alternate television frames to produce a chrominance-inverted video signal at the receiver.

Thus all of the components of the colour video signal which lie in the chrominance spectral band (e.g. 2 to 4.2 MHz), i.e. the chrominance and colour reference burst signal components, in alternate frames are inverted at the transmitter. As a consequence, a conventional monochrome single pel predicter can be used to encode the resultant signal using interframe difference coding. At the receiver, the decoded signal is again subjected to inversion of components in the chrominance spectral band in alternate frames. However, it is important aspect of this invention that the chrominance component inversion at the receiver is effected for those frames for which there was no inversion at the transmitter. The resultant signal is not the original NTSC colour video signal, but a variant of the original signal in which all of the components in the chrominance spectral band have been inverted. This chrominance-inverted video signal is reproducible on a conventional NTSC colour television receiver with relatively good picture quality. This contrasts significantly with a situation in which chrominance components in the same frames are inverted at the transmitter and are re-inverted at the receiver to reproduce the original NTSC colour video signal; in such a signal the frames have alternately been subjected to zero and two chrominance component inversions, with the result that the slight degradation due to each chrominance inversion becomes distinctly noticeable. The method of the invention subjects all of the frames to only one chrominance inversion, so that the slight degradation is relatively unnoticed. Thus in accordance with the method of the invention the precise waveform of the composite NTSC television signal is not strictly preserved, as in the prior art discussed above.

Preferably the components in the chrominance spectral band are inverted by separating the components of the video signal in the luminance and chrominance spectral bands by filtering, said filtering including comb filtering using a comb filter having spectral null points at odd multiples of half the television line frequency; inverting the separated components in the chrominance spectral band in alternate television frames; and combining the luminance and alternate-frame-inverted chrominance components.

The chrominance inversion can be effected on the analog video signal, before conversion to a digital signal at the transmitter and after conversion from a digital signal at the receiver, but it is preferably effected on the digital video signals at the transmitter and at the receiver.

Thus according to another aspect this invention provides a method of transmitting an analog NTSC colour video signal via a digital signal transmission channel, comprising the steps of:
 (a) converting the analog video signal to a digital video signal;
 (b) filtering the digital video signal in a digital filter, comprising a comb filter having spectral null points at odd multiples of half the television line frequency, to separate components of the signal in the chrominance spectral band from components in the luminance spectral band;

(c) recombing the chrominance and luminance components with the chrominance components inverted in alternate television frames to produce an alternate-frame chrominance-inverted digital video signal;

(d) transmitting said alternate-frame chrominance-inverted digital video signal via said digital signal transmission channel using interframe difference coding at the transmitter and decoding at the receiver;

(e) at the receiver, repeating steps (b) and (c) on the received, decoded, digital video signal with the chrominance components in the other alternate television frames being inverted, to produce a chrominance-inverted digital video signal; and (f) converting the chrominance-inverted digital video signal to a chrominance-inverted analog video signal which is reproducible on an NTSC colour television receiver.

In accordance with a preferred embodiment of the invention described in detail below, steps (b) and (c) comprise filtering the digital video signal in a digital bandpass filter having a pass band including the chrominance spectral band; filtering the bandpass-filtered digital video signal in said comb filter to produce a digital chrominance signal; delaying the digital video signal for a time corresponding to the signal transmit time through the bandpass filter; subtracting the bandpass-filtered digital video signal from the delayed digital video signal and delaying the result for a time corresponding to the signal transit time through the comb filter to produce a digital luminance signal; and adding the chrominance signal to and subtracting it from the luminance signal in alternate frames to produce the alternate-frame chrominance-inverted digital video signal.

The method preferably further includes the step of sub-Nyquist sampling said alternate-frame chrominance-inverted digital video signal at twice the colour subcarrier frequency prior to the interframe difference coding and transmission.

As already indicated, the invention is particularly suited to the transmission of video-telephone-quality video signals at a relatively low bit rate. Accordingly, the interframe difference encoded digital signal which is transmitted via the digital signal transmission channel is preferably transmitted at a bit rate of about 6 Mb/s.

The invention will be further understood from the following description with reference to the accompanying drawings, in which:

FIGS. 5 and 6 illustrate respectively a bandpass filter and a comb filter which form parts of the chrominance inversion filter of FIG. 4.

Figure 1:
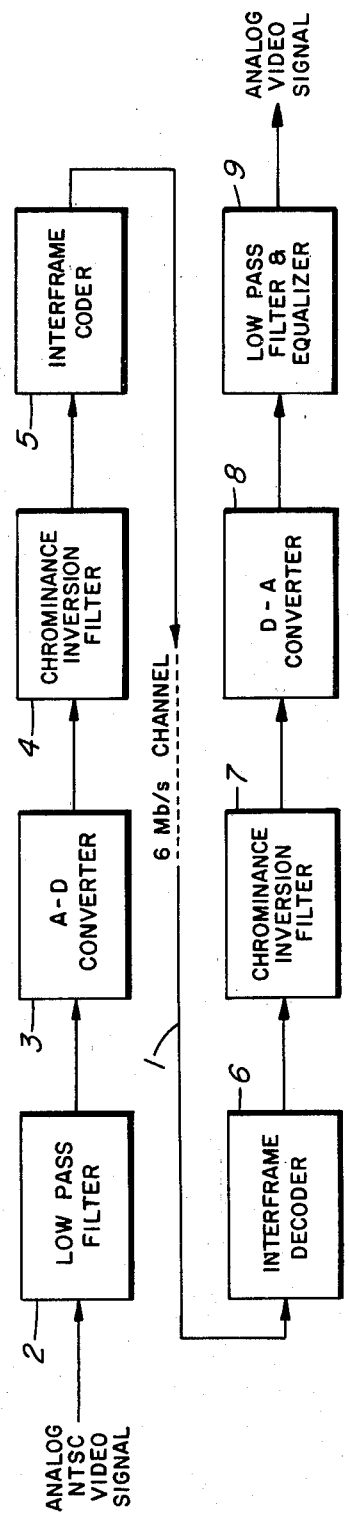
FIGS. 1 and 2 are block diagram illustrating alternative forms of apparatus which operate in accordance with this invention.

FIG. 1 illustrates apparatus for transmitting an analog NTSC colour video signal via a 6 Mb/s digital signal transmission channel 1, comprising a low pass filter 2, an analog-to-digital converter 3, a chrominance inversion filter 4, and an interframe difference coder 5 at a transmitting end of the channel 1, and an interframe difference decoder 6, a chrominance inversion filter 7, a digital-to-analog converter 8, and a low pass filter and equalizer 9 at a receiving end of the channel.

The filter 2, which is supplied with the analog NTSC colour video signal, has a $-3$ dB cut-off at 4.2 MHz and serves to remove any frequencies outside the bandwidth of the 4.2 MHz baseband video signal. The filtered analog signal is sampled at 4 times the colour subcarrier frequency ($4 \times 2.58$ MHz $= 14.32$ MHz) and is converted into an 8 bit digital signal in the analog-to-digital converter 3. As described more fully below, in the chrominance inversion filter 4 the components of this digital signal in the luminance and chrominance spectral bands are separated, the chrominance components in alternate television frames are inverted, and the resultant components are combined to produce an alternate-frame chrominance-inverted video signal. This signal is encoded by the coder 5, transmitted via the channel 1, and decoded by the decoder 6 in known manner using interframe difference coding with a conventional pel predictor.

In the chrominance inversion filter 7, which is similar to the filter 4, the components of the decoded signal in the luminance and chrominance spectral bands are again separated, the chrominance components in the alternate television frames which have not been inverted in the transmitter are now inverted, and the components are again combined to produce a video signal in which all chrominance components have been inverted. This signal is converted into an analog signal in the digital-to-analog converter 8, and the analog signal is filtered in the low pass filter and equalizer 9, which compensates for the sampling and digital conversion operations, to produce an output analog video signal having inverted chrominance.

Because both the chrominance components of the pels, and the colour burst reference during the horizontal line synchronization intervals, are inverted by the filters 4 and 7, the output analog video signal is reproducible on an NTSC colour television receiver, even though this signal has inverted chrominance compared to the original NTSC video signal. Furthermore, because the filters 4 and 7 operate to invert the chrominance components of different frames, the chrominance components in all of the frames are treated equally, so that the slight degradation in picture quality due to inversion of the chrominance components is not very noticeable. This is in contrast with a system in which chrominance components in only one set of alternate frames are inverted at the transmitter and inverted again to produce the original NTSC video signal at the receiver, with the result that there is a significant and noticeable picture quality difference between frames in the reproduced picture at the receiver.

Figure 2:
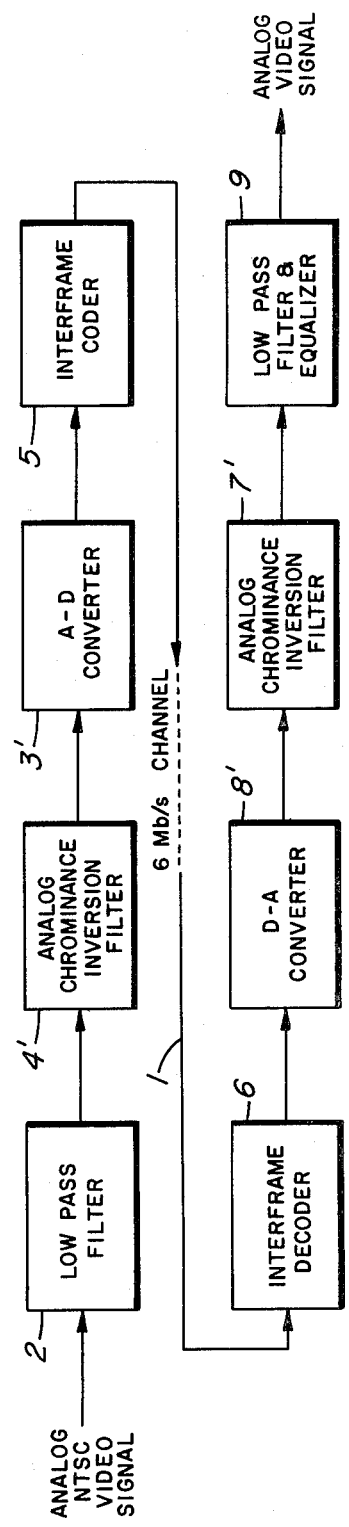

FIG. 2 illustrates an alternative form of the apparatus, which is similar to that of FIG. 1 except in that the converters and chrominance inversion filters are interchanged. Thus in FIG. 2 the signal from the low pass filter 2 is passed through an analog chrominance inversion filter 4' before being digitized in an analog-to-digital converter 3', and the signal from the interframe difference decoder 6 is converted into an analog signal in a digital-to-analog converter 8' before being passed through an analog chrominance inversion filter 7'. Otherwise the apparatus of FIG. 2 is the same as and operates in the same manner as that of FIG. 1.

Figure 3:
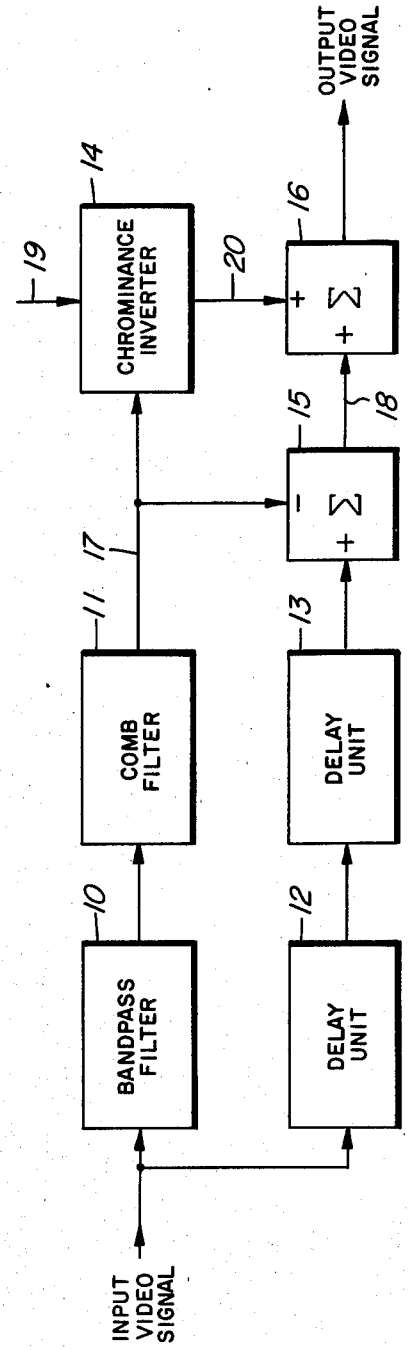
FIG. 3 is a block diagram illustrating a general form of a chrominance inversion filter which is used in the apparatus of FIG. 1 or 2.

FIG. 3 illustrates the general form of each chrominance inversion filter 4, 4', 7, and 7', which comprises a bandpass filter 10, a comb filter 11, delay units 12 and 13, a chrominance inverter 14, and summers 15 and 16. The video signal at the input of the chrominance inversion filter is filtered by the bandpass filter 10, which has a pass band from 2 MHz to 4.2 MHz, and by the comb filter 11, which has spectral null points located at odd multiples of half the television line scanning frequency, to produce only the components of the video signal which lie within the chrominance spectral band on a line 17. The input video signal is also delayed in the delay units 12 and 13 for times equivalent to the signal delays through the filters 10 and 11 respectively. In the summer 15, the filtered chrominance components on the line 17 are subtracted from the delayed video signal to produce the luminance components of the video signal on a line 18. Under the control of a signal supplied via a line 19, the chrominance inverter 14 inverts the chrominance components on the line 17 in alternate frames to produce alternate-frame-inverted chrominance components on a line 20. In the summer 16, the components on the lines 20 are combined to produce the alternate-frame chrominance-inverted video signal at the output of the chrominance inversion filter.

Figure 4:
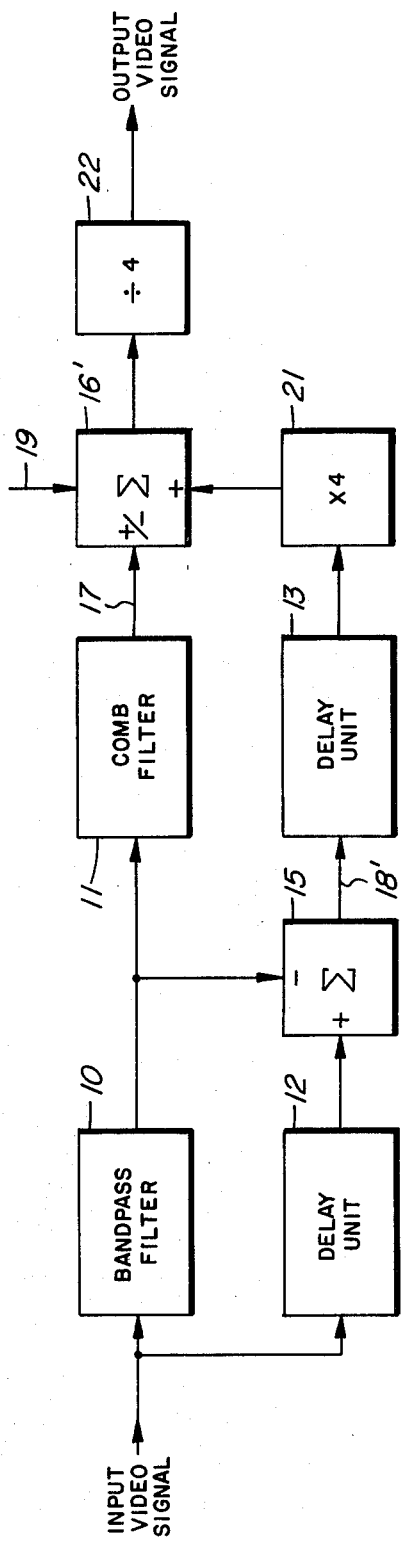
FIG. 4 is a block diagram illustrating a specific form of a chrominance inversion filter for use in the apparatus of FIG. 1.

FIG. 4 illustrates a preferred form of the digital chrominance inversion filter 4 in FIG. 1, which permits sub-Nyquist sampling at the expense of removal of high frequency luminance components. As in the filter of FIG. 3, the sampled input video signal is passed via the bandpass filter 10 and comb filter 11 to produce chrominance components on the line 17. In this case the filters 10 and 11 are digital filters which are described below with reference to FIGS. 5 and 6. The input video signal is also delayed in the delay unit 12 for a time equal to the signal transit time through the filter 10, and in the summer 15 the bandpass filtered signal is subtracted from the delayed input signal to produce a luminance component signal on a line 18'. This luminance component signal is delayed in the delay unit 13 for a time equal to the chrominance signal transit time through the comb filter 11. In a summer 16' the chrominance components are subtracted from or added to, in alternate frames depending on the signal on the line 19, the luminance components multiplied by 4, as shown by a multiplier 21, and the result is divided by 4, as shown by a divider 22, to produce the alternate-frame chrominance-inverted output video signal.

FIG. 5 illustrates the bandpass filter 10 of FIG. 4, which comprises three cascaded bandpass filter elements 23, only one of which is shown in detail, the others being similar, three delay elements 24, and a divided-by-64 function 25. Each element 23 comprises two delay elements 26 each having a delay of 2T, where T is the sampling period (1/14.32 MHz), a multiply-by-two function 27, and two summers 28. The accuracy of the initially 8-bit input signal is maintained through the units 23 and two of the delay elements 24, which serve for data alignment, and each have a delay T, to produce a 14-bit signal which is reduced to 8 bits by the divide-by-64 function 25.

FIG. 6 illustrates the comb filter 11 of FIG. 4, which comprises two delay units 29, each having a delay of TL which is equal to the video line period, a multiply-by-2 function 30, summers 31, and a delay element 32 having a delay T. This form of comb filter is known and accordingly need not be described further here.

In the filters of FIGS. 4, 5, and 6, the various delay elements are constituted by edge-triggered D-type flip-flops, and the various summers are constituted by high speed LSI arithmetic logic units which perform either addition or subtraction depending on a control input. The multiplication and division functions are achieved simply by shifting the binary signal appropriately, zeroes being inserted in the least significant bit positions which are created in the case of multiplication.

The comb filter 11 passes chrominance energy which is centered at odd multiples of half the video line frequency and suppresses high frequency luminance components centered at integral multiples of the video line frequency, throughout the 2 to 4.2 MHz frequency band defined by the filter 10. The signal on the line 19, which controls chrominance inversion in the alternate frames, is a square wave having a 50% duty cycle and a period of two television frames.

The output of the chrominance inversion filter 4, which constitutes an over-sampled alternate-frame chrominance-inverted video signal, is sub-Nyquist sampled at twice the subcarrier frequency (2×3.58 MHz=7.16 MHz) by dropping alternate pels. This results in aliasing chrominance energy falling into the spectral gaps around integral multiples of the television line frequency within the frequency band from 3.58 MHz to 4.2 MHz. In the receiver, the missing pels in the sub-Nyquist sampled digital video signal are replaced by zeroes to regenerate a 14.32 MHz video signal at the input to the chrominance inversion filter 7. The filter 7 is identical to the filter 4 in the transmitter, except that the divide-by-4 function 22 in the filter 4 is replaced by a divide-by-2 function in the filter because the signal energy has been halved due to the sub-Nyquist sampling. In the filter 7, the comb filter removes the aliasing chrominance energy in the same way that the comb filter 11 in the filter 4 removes high frequency luminance energy. As already explained, the filter 7 in the receiver inverts the chrominance components of those frames whose chrominance components have not been inverted by the filter 4 in the transmitter. For example, the chrominance components of odd-numbered frames are inverted at the transmitter and those of even-numbered frames are inverted at the receiver. Information as to which frames are to have their chrominance components inverted at the receiver is transmitter from the transmitter together with information concerning the start of vertical and horizontal synchronization intervals, the synchronizing information itself being extracted from the video signal at the transmitter and added to the video signal at the receiver is known manner.

What is claimed is:
1. A method of transmitting an NTSC colour video signal via a digital signal transmission channel, comprising the steps of:
    inverting components of said video signal in the chrominance spectral band in alternate television frames to produce an alternate-frame chrominance-inverted video signal;
    transmitting said alternate-frame chrominance-inverted video signal via said digital signal transmission channel in the form of a digital signal encoded using interframe difference coding at a transmitter and decoding at a receiver; and inverting components of the decoded video signal in the chrominance spectral band in the other alternate television frames which were not inverted at the transmitter to produce a chrominance-inverted video signal at the receiver.

2. A method as claimed in claim 1 wherein the steps of inverting components in the chrominance spectral band at the transmitter and at the receiver comprise:

separating the components of the video signal in the luminance and chrominance spectral bands by filtering, said filtering including comb filtering using a comb filter having spectral null points at odd multiples of half the television line frequency;

inverting the separated components in the chrominance spectral band in alternate television frames; and combining the luminance and alternate-frame-inverted chrominance components.

3. A method of transmitting an analog NTSC colour video signal via a digital signal transmission channel, comprising the steps of:

(a) converting the analog video signal to a digital video signal;

(b) filtering the digital video signal in a digital filter, comprising a comb filter having spectral null points at odd multiples of half the television line frequency, to separate components of the signal in the chrominance spectral band from components in the luminance spectral band;

(c) recombining the chrominance and luminance components with the chrominance components inverted in alternate television frames to produce an alternate-frame chrominance-inverted digital video signal;

(d) transmitting said alternate-frame chrominance-inverted digital video signal via said digital signal transmission channel using interframe difference coding at a transmitter and decoding at a receiver;

(e) at the receiver, repeating steps (b) and (c) on the received, decoded, digital video signal with the chrominance components in the other alternate television frames, which were not inverted at the transmitter, being inverted, to produce a chrominance-inverted digital video signal; and (f) converting the chrominance-inverted digital video signal to a chrominance-inverted analog video signal which is reproducible on an NTSC colour television receiver.

4. A method as claimed in claim 3 wherein steps (b) and (c) comprise:

filtering the digital video signal in a digital bandpass filter having a pass band including the chrominance spectral band;

filtering the bandpass-filtered digital video signal in said comb filter to produce a digital chrominance signal;

delaying the digital video signal for a time corresponding to the signal transit time through the bandpass filter;

subtracting the bandpass-filtered digital video signal from the delayed digital video signal and delaying the result for a time corresponding to the signal transit time through the comb filter to produce a digital luminance signal; and adding the chrominance signal to and subtracting it from the luminance signal in alternate frames to produce an alternate-frame chrominance-inverted digital video signal.

5. A method as claimed in claim 3 or 4 and including the step of sub-Nyquist sampling said alternate-frame chrominance-inverted digital video signal at twice the colour subcarrier frequency prior to the interframe difference coding and transmission.

6. A method as claimed in claim 2, 3, or 4 wherein the interframe difference encoded digital signal which is transmitted via the digital signal transmission channel is transmitted at a bit rate of about 6 MB/s.

* * * * *